United States Patent [19]

Marchand et al.

[11] Patent Number: 5,374,012
[45] Date of Patent: Dec. 20, 1994

[54] SUSPENSION DEVICE FOR LINKING AN ON-BOARD EQUIPMENT ITEM TO THE STRUCTURE OF A VEHICLE

[75] Inventors: Roger Marchand, St. Remy Les Chevreuse; Yves Florentin, Montigny Le Bretonneux; Serge Chicot, Aubergenville, all of France

[73] Assignee: Aerospatiale Societe Nationale Industrielle, Paris, France

[21] Appl. No.: 118,220

[22] Filed: Sep. 9, 1993

[30] Foreign Application Priority Data

Sep. 17, 1992 [FR] France .................. 92 11094

[51] Int. Cl.$^5$ .............................................. B64D 47/08
[52] U.S. Cl. .................. 244/118.1; 248/608;
 248/614; 248/626; 354/74; 267/164; 267/150;
 348/144
[58] Field of Search .............. 244/1 N, 1 R, 17.27,
 244/17.11, 118.1; 248/608, 614, 626; 354/74;
 267/164, 150; 358/103, 108, 109, 113, 125

[56] References Cited

U.S. PATENT DOCUMENTS

| | | | |
|---|---|---|---|
| 2,064,751 | 12/1936 | Hussman | 248/626 |
| 2,312,718 | 3/1943 | Kouyoumjian | 267/1 |
| 2,704,196 | 3/1955 | Beach | 248/358 |
| 2,867,405 | 1/1959 | Curriston | 248/358 |
| 3,090,586 | 5/1963 | Schwegler et al. | 248/608 |
| 3,204,911 | 9/1965 | Lawrence et al. | 248/358 |
| 3,268,199 | 8/1966 | Kordyban et al. | 248/614 |
| 3,625,466 | 12/1971 | Marshall et al. | 248/358 |
| 3,662,661 | 5/1972 | Whitacre et al. | 354/74 |
| 3,691,822 | 9/1972 | Deckard | 267/150 |
| 3,865,340 | 2/1975 | Ellis | 248/399 |
| 5,193,788 | 3/1993 | Richter et al. | 267/164 |

FOREIGN PATENT DOCUMENTS

| | | | |
|---|---|---|---|
| 2202576 | of 1974 | France . | |
| 2451511 | of 1980 | France . | |
| U7306822 | of 1973 | Germany . | |
| 802410 | of 1958 | United Kingdom . | |
| 1703883 | 1/1992 | U.S.S.R. | 267/164 |

*Primary Examiner*—Galen L. Barefoot
*Attorney, Agent, or Firm*—Fisher, Christen & Sabol

[57] ABSTRACT

The invention relates to a suspension device for linking an item of on-board equipment item to the structure of a vehicle, such as a rotary wing aircraft.

Advantageously, it comprises first (5) and second (6) elements shaped at least approximately as plates and capable of being fixed respectively to said structure (3) and to said equipment item (2), and suspension means (7) including damping members (14) linked respectively to the first and second elements and capable of acting along the three roll, pitch and yaw reference axes of said aircraft to absorb the linear displacements along said axes, and elastic suspension members (15) linked respectively to the first and second elements and capable of acting around the three reference axes to absorb the angular displacements.

7 Claims, 3 Drawing Sheets

SUSPENSION DEVICE FOR LINKING AN ON-BOARD EQUIPMENT ITEM TO THE STRUCTURE OF A VEHICLE

FIELD OF THE INVENTION

The present invention relates to a suspension device which links an on-board equipment item to the structure of a vehicle.

Although not exclusively, the suspension device according to the invention is more particularly intended to be arranged between the structure of a rotary wing aircraft, such as a helicopter, and a sighting apparatus.

It is known that equipment items, helicopter-borne in this preferential application, are subjected to significant vibratory phenomena due especially to the main and rear rotors respectively, to their blades, to the transmission, to the engine, etc., as well as to the variable load factors of the helicopter due to its trajectories and to which the said on-board equipment item is subjected.

Thus, when the equipment item is a sighting apparatus of the day/night type, mounted on the structure of the helicopter, the influence of these various stresses is prejudicial to the effectiveness of the sighting apparatus. This frequently translates into a degradation of the stability, by direct action of the vibration especially on the gyroscope and the supports of the optical assemblies, by a degradation in comfort, since the vibrations are then transmitted from the front support of the helmet to the head of the operator, and by a reduction in the very reliability of the appliance, since the optoelectronic sensors and the sight are subjected to continuous vibrations. Moreover, the load factors which correspond to the accelerations of the helicopter have a direct repercussion on the equipment item.

SUMMARY OF THE INVENTION

The object of the present invention is to alleviate the drawbacks encountered in this specific application which adversely affect the performance of the on-board equipment item, and the invention relates to a suspension device especially making it possible to act on the effects of the vibratory phenomena and of the load factors likely to affect the suspended equipment item.

To this end, the suspension device for linking an on-board equipment item to the structure of a vehicle, such as a rotary wing aircraft, is noteworthy, according to the invention, in that it comprises first and second elements shaped at least approximately as plates and is capable of being fixed respectively to said structure and to said equipment item, and suspension means which include damping members linked respectively to the first and second elements and is capable of acting along the three roll, pitch, and yaw reference axes of said aircraft to absorb the linear displacements along said axes, and elastic suspension members linked respectively to the first and second elements and is capable of acting around three reference axes to absorb the angular deflections.

Hence, the suspension device, according to the invention, makes it possible to take account of both the displacements in translation along the three reference axes of the aircraft and the angular deflections around these axes, which are produced by the vibrations and the load factors. Consequently, the device constitutes a "six axes" suspension (three in translation and three in rotation) and moreover forms, by virtue of the flat elements to which the suspension means are linked, an interface or a module which may, for that reason, be easily fitted to any type of aircraft, such as helicopters, and any equipment item to be fitted, without having to have recourse to significant structural modifications of the aircraft.

Said first and second plate-shaped elements are then arranged parallel with respect to one another, in a plane formed by the roll and pitch axes of said aircraft. Advantageously, said first and second elements, between which said damping members and said elastic suspension members are provided, are joined together laterally by means of a peripheral flexible joint, and on the outer faces of said first and second elements are provided joints providing, by the use of fixing means, a sealed link between said outer faces of the elements and, respectively, the structure of said aircraft and said equipment item. Thus a suspension module is produced which is entirely sealed with respect to the suspension means, which guarantees maximum protection and enhanced lifespan.

In a preferred embodiment, said damping members are shaped into a plurality of closed loops, contained in planes orthogonal to the plane defined by said roll and pitch axes and arranged equally distributed in angle with respect to one another around the yaw axis of said aircraft. More particularly, said loops exhibit an oblong shape. The large axis is inclined substantially at 45° with respect to the plane of said elements, so as to converge towards the structure of said aircraft. By virtue of this configuration of the oblong loops, the translational displacements along the three orthogonal axes, due to vibrations and other load factors, are taken account of, making it possible to rapidly to stabilize the suspended plate and, thus, the equipment item with respect to the fixed plate integral with the structure of the helicopter.

Said loops, which define said damping members, are preferably produced in a metal material, in the form of cables. In order to absorb the slightest stressing, said loops are advantageously close to the periphery of said plate-shaped elements, and each loop is fixed respectively to said plates by bolts arranged substantially along the small axis of said oblong loop.

Moreover, said elastic suspension members advantageously comprise torsion bars arranged respectively in such a way as to prevent angular deflections around three reference axes of said aircraft. More particularly, three anti-roll, anti-pitch and anti-yaw torsion bars are provided to act respectively around three reference axes, said torsion bars being contained substantially in the same plane parallel to that formed by the roll and pitch axes of said aircraft, and each being arranged orthogonally to and equidistantly from the corresponding reference axis of said aircraft. In a preferred embodiment, each of said torsion bars is linked, on one hand, to said element fixed to the structure of the aircraft, by means of bearings in which are housed the extremities of the bar, and, on the other hand, to said suspended element bearing said equipment item, by means of two sets of two articulated link rods, of which the first ones are connected in the vicinity of the extremities of each bar along a direction parallel to said corresponding reference axis, and of which the other link rods are articulated to clevises fixed to said suspended element, along a perpendicular direction.

The assembly of these torsion bars thus makes it possible to take account of the rotations likely to appear around the reference axes of said aircraft during vibratory phenomena and load factors, and possibly gives rise to undesirable displacements of the suspended element which bears the equipment item with respect to the fixed element of the device, integral with the structure of the helicopter.

The figures of the attached drawing will make it easy to understand how the invention can be produced. In these figures, identical references designate similar elements.

DESCRIPTION OF THE PREFERRED EMBODIMENT(S)

Figure 1:
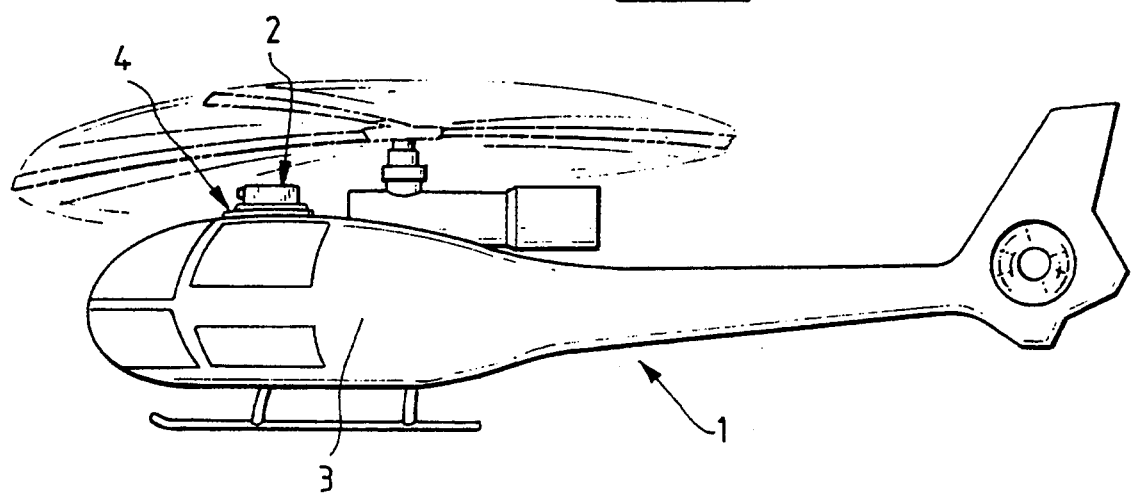
FIG. 1 represents a helicopter on which a sighting equipment item is fitted, by means of a suspension device in accordance with the invention.

As FIG. 1 shows, the helicopter represented by numeral 1 is provided with an on-board equipment item 2, which is linked to the structure 3 of said helicopter by means of a suspension device 4 in accordance with the invention, which makes it possible to absorb the vibrations and movements encountered on this type of rotary wing aircraft. By way of example, the equipment item 2 may be a sighting apparatus, so that it is essential, for the reasons set out above, to suppress the effects of parasitic frequencies and other load factors to which the equipment item is subjected, so that the sighting apparatus/pilot link operates in the best possible conditions.

Figure 2:
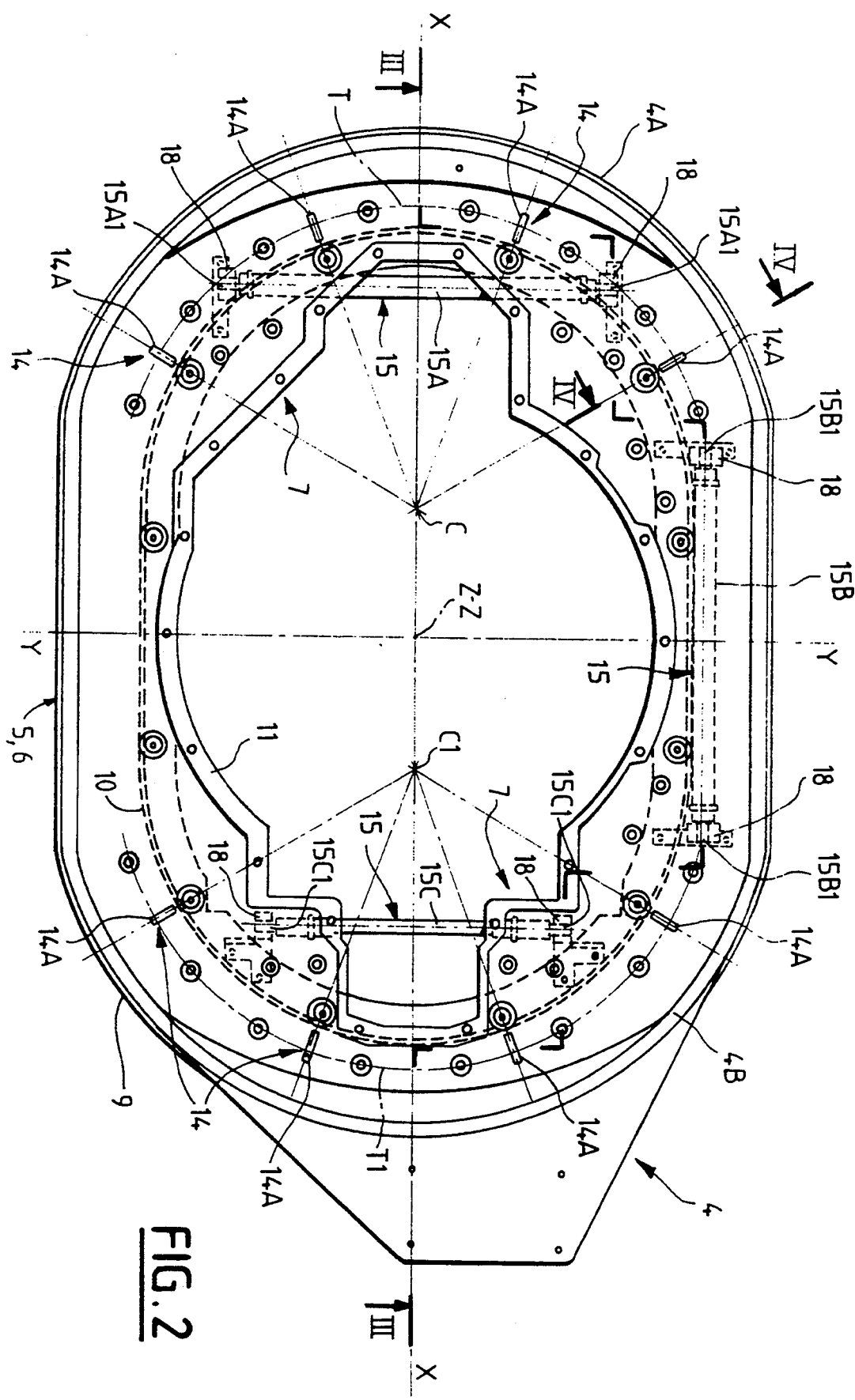
FIG. 2 is a top view of said device illustrated in FIG. 1.
Figure 3:
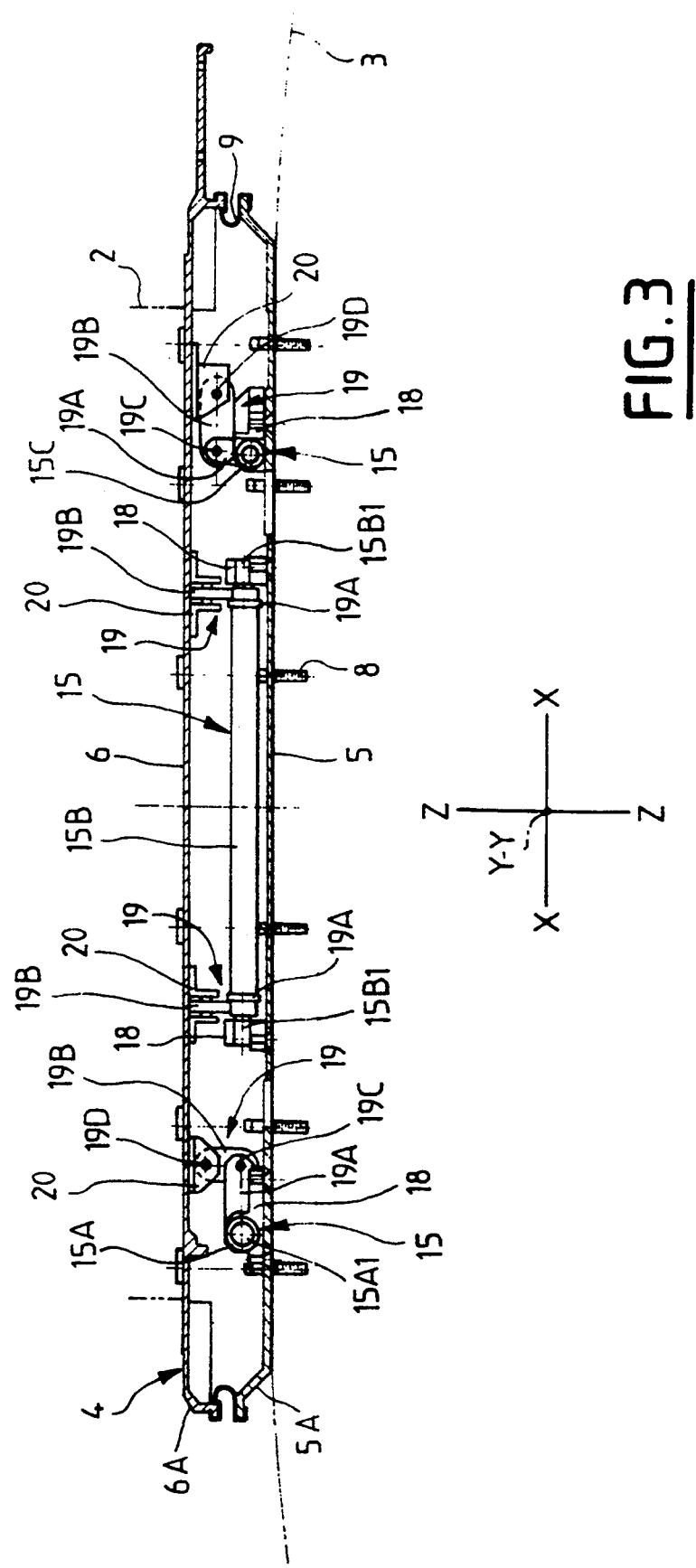
FIG. 3 shows a cross section of said suspension device along the line III—III of FIG. 2.

The suspension device 4 has the form of a module which comprises two elements 5 and 6 which are defined, in this embodiment, by plates, and between which suspension means 7 are arranged. More particularly, the plates 5 and 6 of the suspension device 4 are spaced apart parallel to one another and, with respect to the roll X—X, pitch Y—Y and yaw Z—Z axes of the right-angled reference system of said helicopter, they are contained in planes parallel to the plane formed by the roll X—X and pitch Y—Y axes of said reference system, as FIGS. 2 and 3 show. These two plates 5 and 6 are linked respectively to the structure 3 of the helicopter and to the equipment item 2. For example, the first, then lower, plate 5, is fixed to the structure 3 by bolts 8, while the second, upper, plate 6, carries the equipment item 2 via fixing means which are not represented, but are known per se. Hence, the second upper plate 6, which accommodates the equipment, is suspended with respect to the first, lower plate, fixed to the structure of the helicopter, via suspension means 7.

Figure 4:
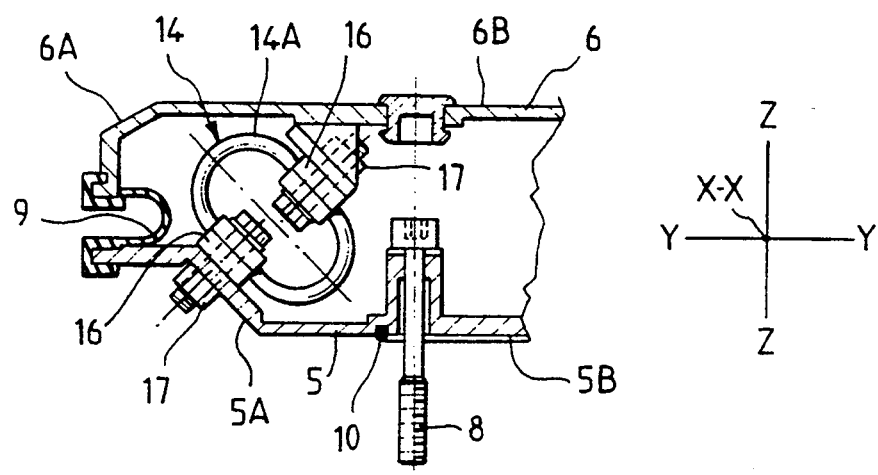
FIG. 4 is a cross section along line IV—IV of FIG. 2 which shows one of the damping members of the suspension means.

It will be noted moreover that in FIGS. 2 to 4, the two plates 5 and 6, whose outer shape described is oblong in this example, are slightly curved towards one another at their peripheral extremities 5A and 6A, and an elastic flexible joint 9 provides the sealed link between said curved extremities 5A and 6A. Moreover, shaped joints 10 and 11 also ensure sealing respectively between the structure 3 and the outer face 5B of the first plate 5, and between the equipment item 2 and the outer face 6B of the second plate.

The suspension means 7 of the device, provided between the two plates 5 and 6, advantageously comprise damping members 14 intended to act along the three X—X Y—Y and Z—Z references axes so as to absorb the linear displacements of the suspended "upper plate 6—equipment item 2" assembly along said axes, and elastic suspension members 15 intended to act around the three X—X, Y—Y and Z—Z reference axes so as to absorb the angular deflections of said suspended assembly around said axes.

More particularly, the damping members 14 shown in FIGS. 3 and 4 consist of a plurality of identical closed loops 14A which, in this exemplary embodiment, have an oblong configuration and which are all contained in planes orthogonal to the plane formed by the roll X—X and pitch Y—Y axes, which correspond to the plate 5 which is fixed with respect to the structure 3 of the helicopter. These closed loops 14A are eight in number, for example, and they are equally distributed in angle with respect to one another, thus consequently forming an angle of 45° between them. Structurally, said loops 14A are produced in a metal material, in the form of cables, thus ensuring good elasticity and heavy damping.

It can be seen especially in FIG. 2 that, since the plates 5 and 6 of the device exhibit an oblong configuration, four of the eight metal closed loops 14A are regularly spaced over the same semi-circular trajectory T, with center C, which correspond to that of the front circular part 4A of the device 4 with respect to the direction of movement of the helicopter 1, while the other four loops 14A are also arranged along the same semi-circular T1 trajectory, with center C1, which correspond to that of the then rear circular part 4B of the oblong device. Quite obviously, the radii of the trajectories T and T1 are identical and the centers C and C1 are aligned along the roll axis X—X. Moreover, the trajectories T and T1, on which the loops 14A are situated perpendicularly, are close to the curved extremities 5A and 6A of the plates, so as to be furthest apart from one another and, thus, rapidly to absorb the slightest movement along the three axes.

Furthermore, as FIG. 4 shows, the large axis of each of the oblong closed loops 14A, which are arranged orthogonally to the plane formed by the X—X and Y—Y axes, is inclined at 45° with respect to the latter, in such a way that all the large axes of the four loops situated on the same trajectory converge respectively at the same point, situated on an axis which contains the center C or C1 and parallel to the yaw axis Z—Z. Each loop 14A is then mounted on the plates 5 and 6 by means of specific supports 16 and bolts 17 directed along the small axis of the oblong loops, perpendicular to the large axis. It can be seen in FIG. 4 that the two bolts 17, respectively fixing the two strands of the loop engaged in their supports 16 to the plates 5 and 6, are slightly offset parallel with respect to one another, thus showing the position under load.

The configuration of the oblong metal loop dampers, the loops of which are distributed around the periphery of the suspension device 4, makes it possible to act optimally and upon the slightest harmful stressing (vibrations, load factors) by translation along the axes and, thus, to rapidly absorb the displacements of the suspended plate, to which the equipment item is linked, with respect to the fixed plate, integral with the structure of the helicopter.

The elastic suspension members 15 of said suspension means 7 are defined by torsion bars the purpose of which is to prevent the angular deflections around the three X—X, Y—Y and Z—Z references axes of the helicopter. To do that, three torsion bars, then called anti-roll 15A, anti-pitch 15B and anti-yaw 15C torsion bars are provided to act around corresponding roll X—X, pitch Y—Y and yaw Z—Z axes respectively of the helicopter, and thus absorb the angular rotations.

As FIG. 3 shows, these three torsion bars 15A, 15B and 15C, approximately mutually identical, are arranged substantially in the same plane which is parallel to the plane formed by the roll X—X and pitch Y—Y axes, that is to say parallel to the plates 5 and 6. They are linked, by a structurally similar mounting, to the fixed plate 5 integral with the structure 3 of the helicopter and to the suspended plate 6 bearing the on-board equipment item 2.

Thus, it can be seen in FIGS. 2 and 3, that the anti-roll torsion bar 15A is, for example, situated at the front part 4A of the device, being arranged, consequently, orthogonally to and advantageously equidistantly from the roll axis X—X. The extremities 15A1 of the bar are housed in swivel bearings 18 fixed to the lower plate 5 which is integral with the structure 3 of the helicopter. Two identical sets 19 of link rods each 19A and 19B, articulated together around respective axes 19C parallel to the bar 15A, link the latter to the suspended plate 6. More particularly, the link rods 19A are mounted around the torsion bar 15A, in the vicinity of the respective extremities 15A1 engaged in said bearings, while the link rods 19B are mounted, by means of respective articulation shafts 19D, parallel to the shafts 19C, in clevises 20 fixed to the suspended plate. Moreover, the direction of the link rods 19A is parallel to the roll axis X—X, while the direction of the link rods 19B is, for itself, parallel to the yaw axis Z—Z, so that the link rods 19A and 19B form a right-angled elbow bend between them.

It can thus be understood that, by the configuration of this torsion bar 15A and of the two sets of link rods 19A, 19B, the angular deflection around the roll axis X—X, of the suspended plate bearing the equipment item with respect to the fixed plate integral with the helicopter, is prevented and absorbed by the torsion bar 15A.

Similarly, the anti-pitch torsion bar 15B is, for example, offset parallel with respect to the roll axis X—X, to be arranged orthogonally to and respectively on either side of the pitch axis Y—Y. The extremities 15B1 of this torsion bar 15B are carried by swivel bearings 18 fixed, like the previous ones, to the lower plate 5, and two identical sets 19 of two link rods each 19A, 19B, similar to the preceding ones, are provided. Thus, the two link rods 19A, close to the respective extremities 15B1 of the bar, are then directed parallel to the pitch axis Y—Y, while the two other link rods 19B are parallel to the yaw axis Z—Z, these latter being linked, by articulation shafts 19D, to the upper suspended plate 6 by means of clevises 20. Consequently, a translational displacement along the Y—Y axis of the link rods is capable of being translated into an elastic torsion the bar 15B1 around its axis, which takes up the angular deflection around the pitch axis Y—Y.

Finally, the anti-yaw torsion bar 15C is situated at the rear part 4B of the device, being arranged orthogonally to and equidistantly from said yaw axis Z—Z. The extremities 15C1 of this bar are housed in swivel bearings 18 which are fixed to the lower plate 5 of the device. Two sets 19 of link rods 19A and 19B identical to the preceding ones, provide the link of the bar to the upper plate 6. More particularly, the direction of the link rods 19A, which are linked to the torsion bar 15C in the vicinity of its extremities 15C1, is parallel to the yaw axis Z—Z, while the direction of the link rods 19B, articulated to the link rods 19A by shafts 19C, is parallel to the roll axis X—X. A translational displacement along the X—X axis, which follows the link rods 19B, is then possible and it translates, via the link rods 19A, into an elastic torsion of the bar 15C, so that the angular deflection around the yaw axis Z—Z is prevented.

It can thus be understood that, whatever the various stressing produced (vibrations, load factors, etc.), the suspension device 4 according to the invention allows them to be attenuated by virtue of the metal-loop damping members 14, which takes into account the translations along the three axes, and of the torsion bars 15 which oppose rotations around said axes, so as best to stabilize the on-board equipment item linked to the suspended plate with respect to the structure of the helicopter. Hence, the image stabilization of the sighting equipment, the visual comfort for the operator and the reliability of the equipment item are improved, by virtue of the suspension means of the device, which act especially on the desired vibratory spectra. Moreover, the production of the device in the form of a module allows it to accommodate various types of equipment, and to be fitted to all types of helicopters without having recourse to significant modifications.

We claim:

1. A suspension device for linking an on-board equipment item to the structure of a vehicle, said suspension device being capable of acting along the three roll, pitch and yaw reference axes of said vehicle to absorb the linear displacements along said axes and to act around the three reference axes to absorb the angular displacements, said suspension device comprising:
    (a) two elements (5, 6), each of which is shaped approximately like a plate and is capable of being fixed to said structure (3) and to said equipment item (2), said two elements (5, 6) being arranged parallel to one another in a plane formed by the roll and pitch axes of said aircraft;
    (b) a plurality of damping members (14), said damping members (14) being shaped into a plurality of closed loops (14A) where said closed loops (14A) exhibit an oblong shape, the large axes of which are inclined substantially at 45 degrees with respect to the plane of said elements (5, 6) so as to converge towards said structure of said aircraft, and said damping members (14) being contained in planes orthogonal to the plane defined by said roll and pitch axes and being arranged equally distributed in angle with respect to one another around said yaw axis of said aircraft;
    (c) suspension means (7) arranged between and linked to each of said two elements (5, 6) and including said damping members (14), said suspension means being capable of absorbing said linear displacements along said axes; and
    (d) elastic suspension members (15) linked to each of said two elements (5, 6) and being capable of absorbing said angular deflections.

2. The suspension device as claimed in claim 1, wherein said elastic suspension members (15) further comprise three anti-roll torsion bars (15A), three anti-pitch torsion bars (15B) and three anti-yaw torsion bars (15C), said three anti-roll torsion bars (15A) being arranged orthogonally to and equidistantly from said roll reference axis of said aircraft to act around said roll reference axis, said three anti-pitch torsion bars (15B) being arranged orthogonally to and equidistantly from said pitch reference axis of said aircraft to act around said pitch reference axis, and said three anti-yaw torsion bars (15C) being arranged orthogonally to and equidistantly from said yaw reference axis of said aircraft to act around said yaw reference axis, said three anti-roll torsion bars (15A), said three anti-pitch torsion bars (15B) and said three anti-yaw torsion bars (15C) being arranged to prevent angular deflections around said roll, pitch and yaw reference axes.

3. The suspension device as claimed in claim 1, further comprising a plurality of bearings (18), four articulated link rods and a plurality of clevises, said three anti-roll, three anti-pitch and three anti-yaw torsion bars (15A, 15B, 15C) being linked to said element which has not been suspended, said element being fixed to said structure of the vehicle by means of said bearings (18) in which are housed the extremities of said bars (15A, 15B, 15C), and said three anti-roll, three anti-pitch and three anti-yaw torsion bars (15A, 15B, 15C) linked by means of a first set and a second set of two articulated link rods to said element which has been suspended (5) and which bears said equipment item (2), said first set of two articulated link rods being connected in the extremities of said bars (15A, 15B, 15C) along a direction parallel to said corresponding reference axis, and said second set of two articulated link rods being articulated along a perpendicular direction to said clevises (20) being fixed to said element which has been suspended (5), said torsion bars (15A, 15B, 15C) comprising said elastic suspension members (15) and being arranged so as to prevent angular deflections around said roll, pitch and yaw reference axes.

4. The suspension device as claimed in claim 1, further comprising a peripheral flexible joint (9), a plurality of joints (10, 11) and a fixing means, said peripheral flexible joint (9) joining together said elements (5, 6) between which said damping members (14) and said elastic suspension members (15) are provided, and said joints (10, 11) by use of said fixing means provide a sealed link between the outer faces of said elements (5B, 6B) and said structure (3) of said vehicle and said equipment item (2).

5. The suspension device as claimed in claim 1 wherein said vehicle is a rotary wing aircraft.

6. The suspension device as claimed in claim 1, wherein said closed loops (14A) defining said damping members (14) are produced in the form of cables of a metal material.

7. The suspension device as claimed in claim 1, wherein said closed loops (14A) are close to the periphery (5A, 6A) of said two elements (5, 6), and wherein each closed loop (14A) is fixed to said two elements (5, 6) by a plurality of bolts (17) arranged substantially along said small axis of said closed loop.

* * * * *